B. Crawford.
Pressure Gauge.
Nº 8,797.  Patented Mar. 16, 1852.
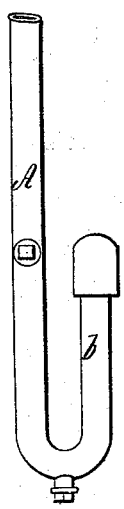
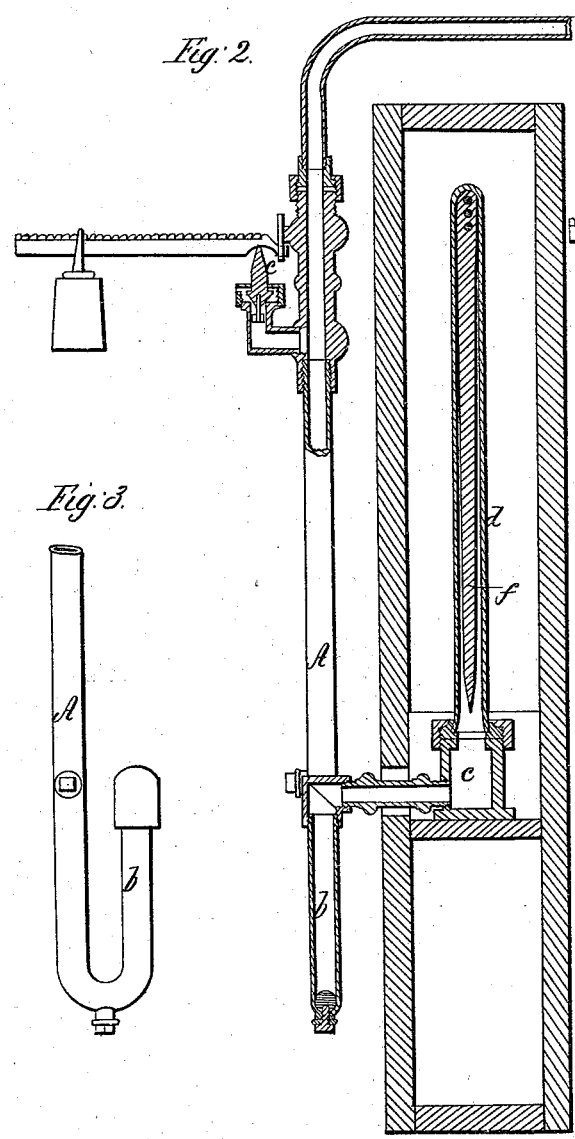
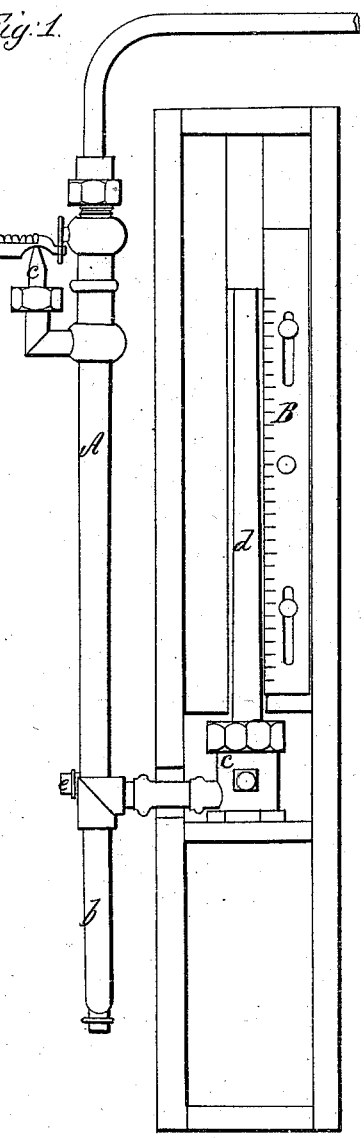

UNITED STATES PATENT OFFICE.

BENJAMIN CRAWFORD, OF ALLEGHENY CITY, PENNSYLVANIA.

PRESSURE-GAGE.

Specification of Letters Patent No. 8,797, dated March 16, 1852.

*To all whom it may concern:*

Be it known that I, BENJAMIN CRAWFORD, of Allegheny city, in the county of Allegheny and State of Pennsylvania, have invented a new and useful Improvement in Steam-Gages for Boilers; and I do hereby declare that the following is a full, clear, and exact description of my said invention, reference being had to the accompanying drawings, which form part of this specification, and in which—

Figure 1 is a side elevation of the gage, Fig. 2 is a vertical section through the gage parallel to the view in Fig. 1, and Fig. 3 is an elevation of the lower bend of the pipe.

Closed pressure gages as ordinarily constructed have proved very unsatisfactory and unreliable in practice, because, however accurately they may be graduated and adjusted when they leave the hands of the maker and are first applied to the boiler, they very soon become so far deranged by the leakage, evaporation, or absorption of their fluids, that they cease to give accurate indications of the pressure of the steam and remain useless until they have undergone the tedious operation of removal and readjustment.

The object of my invention is to render the closed gage as reliable as any other, and to render the removal of the gage for the purpose of adjustment unnecessary.

I take the well known barometer tube whose bore tapers from the lower end to the bulb in which the upper end terminates, which bulb and the taper and diameter of the tube bear such relations to one another that the air inclosed in the tube, above the fluid piston which intervenes between it and the steam, shall yield through equal linear distances, or thereabout, to equal increments of pressure, so that a scale of equal divisions may indicate the pressure of the steam with sufficient accuracy. As the space within the tube and the quantity of air vary, the limit to which the air is compressed at one time, by a given pressure, will vary from that to which it is at other times compressed by the same pressure, and therefore a fixed scale usually requires a correction, equivalent to these variations, to be calculated and applied to its indices, to ascertain the true pressure of the steam. As these variations resulting from changes in the size of the tube and the quantity of air within it, are not sudden, nor subject to sudden fluctuations, a correction once calculated will usually last for several days, and only needs to be applied to the observed indices, but even this is troublesome and leads to error, and I have avoided it, by making the scale adjustable and combining it with a blow-off valve in communication with the steam, and so weighted, that the pressure at which it blows off is indicated, and can at any time be compared with the indications of the scale, so that the latter may by adjustment be kept in the proper position to indicate the true pressure of the steam.

My improved gage to show the pressure of the steam is attached to a pipe A, which is connected at its upper extremity with the steam space of the boiler and is then bent, in the form of an inverted siphon; the shorter arm *b* of this siphon is connected with a hollow base *c* to which the gage tube *d* is attached. This tube is glass and is closed at its upper end; it is slightly conical or trumpet shaped, so as to afford an increased space for air as it approaches the base *c* to which it is secured. The interior of this gage tube is fitted with a solid rod *f* whose lower end tapers to a point and whose upper extremity is so formed for a short distance as to leave an air cavity of considerable magnitude at the upper extremity of the tube. By means of this cavity, into which the air is compressed, I am enabled in conjunction with the tapering rod to obtain divisions on the scale to denote equal increments of pressure, which are of much greater uniformity in length than I could obtain by means of the tapering rod alone in a tube whose length is within the limits which in practice is admissible in gages for steam boilers. If the tube is made of the proper taper so as to dispense with the rod, its upper extremity must be enlarged to form a bulb containing from one to four inches according to the diameter and length of the tube, otherwise the higher divisions of the scale would be so near together that it would be difficult to read them and there would be great liability to confound them.

The mode of forming an enlargement of the cavity at the head of the tube when the tapering rod is used which I have shown in the drawings is to bore a series of holes transversely through the rod, but so long as the enlarged cavity exists then it is immaterial how it is formed. The longer arm of the siphon tube has an opening in it through which oil or any suitable fluid can be introduced into the siphon to separate the air in the gage tube from the steam proceeding from the boiler, and this opening is fitted with a tight stopper or screw plug e. This known mode of forming the air tube has been adopted by me as it is necessary in order to carry out my invention to have a scale with divisions of equal length or thereabout to denote equal changes of pressure, and, as is represented in the drawing I make the gage scale B adjustable so that it can be raised or depressed and can be secured in any required position to correspond with a standard weight. This standard weight is hung upon a graduated lever g which bears upon a blow off valve C in the siphon pipe A. This valve may be of any approved construction, and may be held upon its seat by the lever g and weight h in any suitable and convenient manner. When the boiler is at work the engineer shifts the weight along the lever toward the fulcrum until the steam begins to escape from the valve, the notch of the lever from which the weight hangs will then indicate the pressure of the steam. He now moves the scale B, of the gage tube until the same division upon it corresponds with the level of the oil or other indicating fluid in the gage tube, and then clamps the scale in its position. The weight of the valve may now be shifted to its outermost position on the lever to prevent the valve from rising; variations in the pressure of the steam will now be shown truly by the position of the oil in the gage tube with respect to the divisons of the scale.

Should the engineer at any time wish to test the accuracy of the gage he has only to move the shifting weight inward until steam begins to escape from the valve; the pressure then indicated by the position of the weight on the lever should correspond with that shown by the height of the oil on the gage scale; if the two do not correspond the scale should be immediately adjusted to the proper position.

By means of this apparatus it is evident that the engineer at all times has it in his power to verify the correctness of his closed gage and to adjust it when it has become deranged, and this is readily accomplished without dismounting the apparatus or requiring the presence of an instrument maker to put it in order.

What I claim as my invention and desire to secure by Letters Patent is—

A closed pressure gage constructed substantially as herein described, so that equal increments of pressure will cause the indicating liquid to rise in the tube equal linear distances or thereabout in combination with an adjustable scale to indicate the degree of pressure, and a standard weight and blow-off valve, by which the scale can from time to time be adjusted so as to give true indications of the pressure of the steam, substantially as herein set forth.

In testimony whereof I have hereunto subscribed my name.

BENJ. CRAWFORD.

Witnesses:
P. H. WATSON,
T. C. DONN.